July 5, 1938.  J. W. LEIGHTON  2,122,476
INDIVIDUAL SUSPENSION
Filed March 20, 1936   2 Sheets-Sheet 1
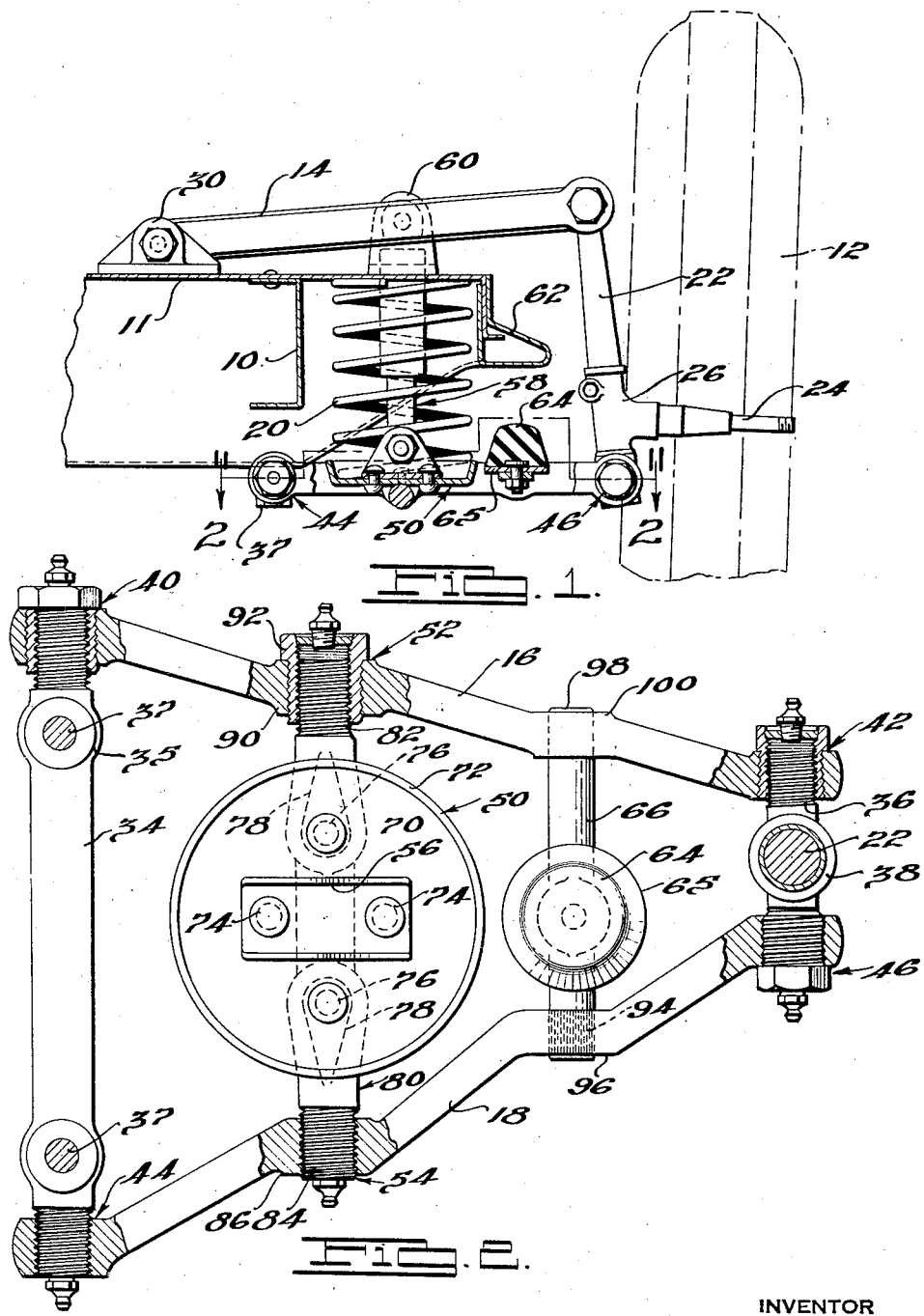
INVENTOR
John W. Leighton.
BY
Harness, Dickey Pierce & Hann.
ATTORNEYS.

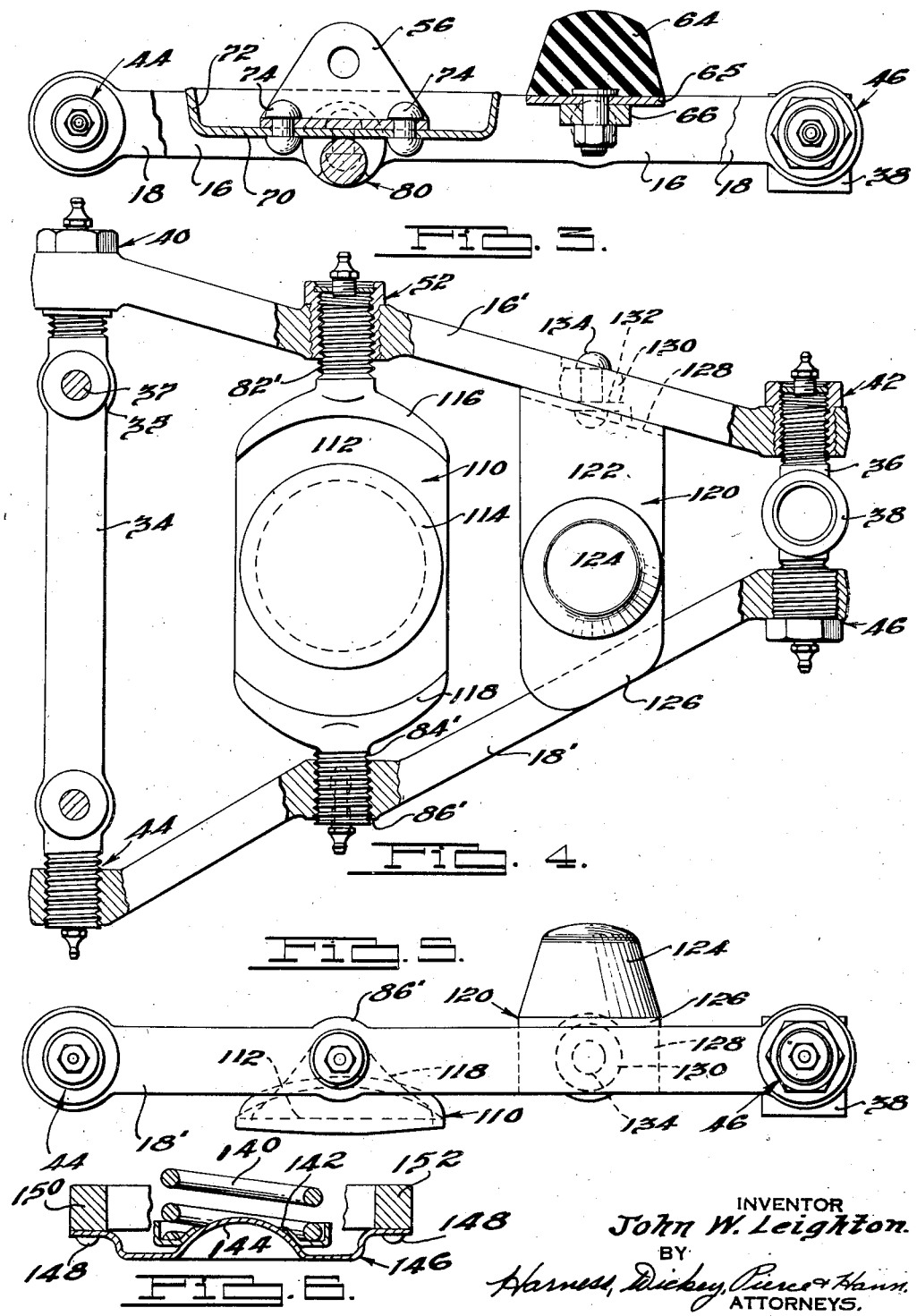

Patented July 5, 1938

2,122,476

UNITED STATES PATENT OFFICE 2,122,476

INDIVIDUAL SUSPENSION

John W. Leighton, Port Huron, Mich.

Application March 20, 1936, Serial No. 69,784

10 Claims. (Cl. 267—20)

The present invention relates to wheel suspensions, and particularly to constructions of the individually sprung type.

Objects of the present invention are to provide an improved individual wheel suspension having a wishbone formed of a pair of pivotally mounted arms and a load spring associated therewith, and embodying improved means to provide for limited movement of the end of the spring relative to the wishbone arms; to provide such suspension embodying a pan rotatably supported by the said arms for forming a seat for one end of said load spring; to provide a suspension of the just mentioned type in which the pan is provided with oppositely disposed radially extending trunnions, one of which is rotatably supported in each wishbone arm; to provide a suspension as just stated in which the connections between the trunnions and the arms are of the threaded bearing type; to provide a suspension of the just mentioned type embodying a pan assembly comprising a cross-shaft extending between the two arms and having the ends thereof connected to the respective arms by bearings of the threaded type, and being adapted to support a circular spring pan in fixed relation thereabove; and to provide a suspension of the just stated type embodying a pan of generally rectangular shape having a substantially plane base portion for forming a spring seat and upstanding bosses formed at each end thereof, each boss being provided with an outwardly directed trunnion adapted to be connected through a bearing of the threaded type to a wishbone arm.

Further objects of the present invention are to provide an improved individual wheel suspension having a wishbone formed on a pair of related arms pivotally connected to a vehicle frame and embodying means connected between the arms for supporting a buffer for cooperation with the frame to limit relative movement between the frame and the wishbone; to provide a construction as just stated in which the buffer support comprises a cross-shaft connected to one of the arms and slidably supported by the other arm; to provide a buffer support embodying a circular cross-shaft splined at one end into one of the arms and having its other end slidable in a circular passage extending through the other arm; to provide a buffer support embodying a member of generally plane configuration, one end of which is freely supported upon the upper surface of one of the wishbone arms and the other end of which is connected by a flange integral therewith to the other wishbone arm.

Further objects of the present invention are to provide a suspension embodying a pair of wishbone arms, a load spring and a pan for supporting the spring between the arms, characterized as being domed to provide a support for the spring upon which the end thereof may tilt or oscillate within selected limits.

Further objects of the present invention are to generally improve and simplify the constructions of wheel suspensions of the individual type, and to provide constructions which are economical of manufacture and assembly and positive and effective in action.

With the above and other objects in view which appear in the following description and in the appended claims, preferred but illustrative embodiments of the present invention are shown in the accompanying drawings, throughout which corresponding reference characters are used to designate corresponding parts, and in which:

Fig. 1 is a fragmentary view in front elevation of a suspension embodying the present invention;

Fig. 2 is a view in top plan, with certain of the parts broken away, taken along the line 2—2 of Fig. 1;

Fig. 3 is a view in side elevation of the lower wishbone structure shown in Fig. 2, with certain of the parts broken away;

Fig. 4 is a top plan view of a modified construction of lower wishbone member;

Fig. 5 is a view in side elevation of the structure shown in Fig. 4, and,

Fig. 6 is a diagrammatic view of a modified embodiment of the invention.

Considering Figs. 1, 2 and 3, it will be understood that the assembly there shown forms a connection between a vehicle frame 10 having a transverse frame member 11 and a wheel 12 thereof, specifically the left hand front wheel, and that a corresponding but oppositely disposed assembly is provided to connect the frame 10 to the other front wheels. While an assembly embodying certain features of the illustrated assembly may be utilized in connection with the rear vehicle wheels, the improvements of the present invention may be clearly disclosed with reference to a front wheel suspension, and, accordingly, the drawings and description are confined to a front wheel suspension.

In a broad sense, the illustrated arrangement embodies the construction described and claimed in the copending application of the present applicant, Serial No. 68,595, filed March 13, 1936, and a further application, Serial No. 69,785, filed March 20, 1936, and comprises in general an upper wishbone arm 14 and a lower pair of wishbone arms 16 and 18, which in combination with the load spring 20 serve to connect the kingpin 22 to frame 10. Wheel 12 is rotatably supported upon a spindle 24 which forms part of a metal bracket 26 which may be suitably associated with king pin 22 to permit bracket 26 to rotate about king pin 22 in steering the vehicle, and yet positively fix bracket 26 in a desired position axially of the king pin 22.

The inner end of the upper wishbone arm 14 is pivotally conected to a bracket 30, secured in upstanding relation upon the cross frame member 10. The connection of arm 14 to bracket 30 is preferably of the threaded type, so as to permit rotation of arm 14 in the plane of the paper as viewed in Fig. 1, about bracket 30 as an axis. The outer end of arm 14 may be similarly and pivotally connected to the upper end of king pin 22.

The lower wishbone arms 16 and 18 are pivotally connected at their inner ends to the cross frame member 10 through a shaft 34, which extends parallel to the axis of the vehicle frame 10 and are correspondingly pivotally connected at their outer ends to a stub shaft or trunnion 36. Trunnion 36 is provided with a centrally positioned transversely disposed boss 38, in which the lower end of king pin 22 is secured. Shaft 34 is secured to frame member 11 by studs 37, which pass through bosses 35 formed in shaft 34.

The bearings designated generally as 40 and 42, associated with arm 16, and 44 and 46, associated with arm 18, by which these arms are pivotally connected to the shaft 34 and the trunnion 36, are illustrated as of the threaded bearing type, and may be, and preferably are, constructed and assembled in the manner described in detail and claimed in the co-pending application of the present applicant, Serial No. 69,785, identified above. It is noted at the present time that the lower wishbone arms 16 and 18 are swingable in a vertical plane relative to the vehicle frame 10 and to king pin 22.

The spring pan assembly, designated generally as 50 and described in more detail hereinafter, is connected between the two arms 16 and 18 by threaded bearing assemblies 52 and 54, respectively, and serves as a seat for the lower end of the load spring 20, the upper end of which is seated against the under side of the upper surface of the transverse frame member 11. As illustrated also, the pan is provided with a centrally positioned clevis 56, which forms a pivotal support for the lower end of a shock absorber 58, which may be of conventional structure and is illustrated as of the bicycle pump type. The upper end of the shock absorber is pivotally connected to a similar clevis 60 secured to the transverse frame member 10.

In order to limit downward movements of frame 10 relative to the wheel 12, a buffer 62 is secured at the outer end of the transverse frame member 11, and cooperates with a resilient buffer 64 secured upon a cross shaft 66, which extends between the wishbone arms 16 and 18 and is described in more detail hereinafter.

Before considering in greater detail the pan assembly 50 and the buffer portion 65, to which assemblies the present invention is particularly directed, the operation of the wheel suspension as a whole may be summarized by noting that a downward movement of the vehicle frame with respect to the wheel, resisted by the compressive force of the spring 20, or a correspondingly resisted upward movement of a wheel 12 with respect to the vehicle frame, results in pivoting the lower wishbone arms 16 and 18 in a counterclockwise direction about their bearings 40 and 44, and a corresponding swinging of the upper arm 14. These swinging movements are accompanied by corresponding pivotal movements between king pin 22 and the arms 14, 16 and 18, the relation between the lengths of the upper and lower arms being such as to maintain a desired relation of wheel 12 to the vertical during such swinging.

The swinging of the arms changes the angle between the arms and the axis of the load spring 20, which changes are however absorbed by tilting movements of the pan. Thus the spring always bears freely upon the pan, and, in operation is not subjected to longitudinal bending or arching.

Considering now the particular construction of the pan assembly 50, the pan 70 is of circular cup-shaped formation provided with an upstanding annular flange 72, and is preferably formed of a single piece of sheet metal by a stamping operation, the circular formation simplifying the stamping, since no complex configuration is involved. The previously mentioned clevis 56, which forms the pivotal support to the lower end of the shock absorber 58, is secured to the upper surface of the face of pan 70 by rivets 74 and is stationary with respect to pan 70.

Pan 70 is provided on its base with a pair of diametrically opposed downwardly extending members 76, which extend through eyelets 78 formed in the cross shaft 80, and which serve to secure pan 70 to shaft 80. Shaft 80 extends between the two cross arms 16 and 18, the ends 82 and 84 thereof being provided with right hand threads of usual form. The threads of the end 84 mate with corresponding threads formed in the offset boss 86 of arm 18. The threads on the end 82 mate with corresponding internal threads formed in a bushing 88. Bushing 88 is provided with external threads having the same pitch as the internal threads thereof, but being substantially more lightly cut, and, in accordance with the invention disclosed and claimed in the above identified co-pending application, Serial No. 69,785, bushing 88, in being assembled with arm 16, cuts threads in the offset boss 90 formed in arm 16. When the completely assembled position is reached, the head 92 of bushing 88 jams against the outer face of boss 90 and jams the bushing and boss threads into locking relation, thereby fixing these elements against relative rotation.

In the assembled condition of the parts, accordingly, shaft 80 is free to rotate within the threaded bearing provided therefor in arms 16 and 18, under the influence of the forces applied to pan 70 through spring 20.

The buffer support 65, for buffer 64, comprises a plate-like element suitably secured to a shaft 66, provided at one end with splineways 94, which mate with corresponding splineways formed in the offset boss 96 in arm 18, thus securing shaft 66 thereto. To facilitate the assembly of parts, and to avoid any possibility of imposing undue stresses on the threaded bearings associated with the arms 16 and 18, the remaining end 98 of shaft 66 is smoothly finished and is freely slidably received within a corresponding offset boss 100 formed in arm 16.

Considering now the modified embodiments shown in Figs. 4 and 5, the arms 16' and 18' of the lower wishbone correspond in all respects to the previously described arms 16 and 18, with the exception that each thereof is provided with only a single bearing boss intermediate its ends. The arms 16' and 18' are pivotally connected by threaded bearing assemblies 40 and 44, respectively, to the cross shaft 34, and by threaded bearing assemblies 42 and 44, respectively, to the trunnion 36, in the manner described with respect to the first embodiment.

In practicing the embodiment now being described, it is preferred to construct the pan 110 of generally rectangular shape, comprising the substantially flat base portion 112, in which is formed or otherwise defined a spring seat 114, and at the opposite ends of which upstanding bosses 116 and 118 are provided. Boss 116 is provided with an externally threaded trunnion 82' which corresponds to the previously described trunnion 82 in all respects and is correspondingly associated with the threaded bearing assembly 52. The boss 118 is provided with an externally threaded trunnion 84' which corresponds to the previously described trunnion 84 in all respects, and is correspondingly associated with the boss 86' to form a bearing of the threaded type.

In the present instance, the buffer support, designated generally as 120, comprises a substantially plane element 122, to which the buffer 124 is suitably secured. The end 126 of the support 120 freely rests upon the upper surface of arm 18'. The other end of support 120 is provided with a downwardly directed flange 128, having a lateral offset 130 formed therein, which presents a surface at right angles to the longitudinal axis of the support. The offset surface thus provided abuts a corresponding surface 132 suitably formed in the cross arm 16' and is secured thereto by the rivet 134. With the just described arrangement, it will be evident that support 120 is firmly supported by both arms 16' and 18', but while being rigidly connected to arm 16', is movable relative to arm 18', and thus, in a broad sense, cooperates with arms 16' and 18' in the manner described in connection with the first embodiment of the present invention.

In the arrangement of Figure 6, the relative movement between the lower end of the load spring and the arms, effected in the previously described embodiments by pivotally mounting the pans, is effected by providing for limited movement of the spring relative to the pan. In Figure 6, the lower end of load spring 140 is provided with a cap or annulus 142 which serves to prevent spreading or flaring of the spring end. Annulus 142 is slidably supported upon a spheroidal dome 144 which is suitably formed in the base of, or secured upon, pan 146 and to which the surface of annulus 142 is complementary. Pan 146, in turn, is secured by rivets 148 to the arms 150 and 152 which form the lower wishbone. The cooperating surfaces of annulus 142 and dome 144 are preferably suitably lubricated. Dome 144 effectively constrains the movement of spring 140, and through the sliding of annulus 142 upon dome 144, a relatively free, but limited, oscillation is permitted between spring 140 and the wishbone arms. The performance as a whole of the assembly thus corresponds to the performance of the previously described embodiments.

Although specific embodiments of the present invention have been described herein, it will be evident that various changes in the form, number and arrangement of parts may be made within the spirit and scope thereof. The described embodiments, accordingly, are to be regarded in an illustrative and not in a limiting sense.

What is claimed is:

1. A wishbone assembly for a wheel suspension or the like comprising, in combination, a pair of wishbone arms connected together at the respective ends thereof, a spring pan, and means pivotally supporting said spring pan upon said arms comprising a pair of oppositely directed trunnions connected to said pan, and means forming a threaded bearing connection between said trunnions and said arms respectively.

2. A wishbone assembly for a wheel suspension or the like comprising, in combination, a pair of wishbone arms connected together at their respective ends in converging relation, offset bosses formed in each arm intermediate the ends thereof, a spring pan associated with said connection, and means cooperating with said offset bosses forming a threaded bearing connection between said spring pan and each of said arms.

3. A wishbone assembly for a wheel suspension or the like comprising, in combination, a pair of wishbone arms connected together at the respective ends thereof, a spring pan having a spring supporting base portion and axially opposite end flanges each provided with an axially extending trunnion, and means forming a threaded bearing connection between each trunnion and one of said arms.

4. A wishbone assembly for a wheel suspension or the like comprising, in combination, a pair of wishbone arms connected together in converging relation at the respective ends thereof, a buffer support, a cross shaft for supporting said buffer support, means forming a non-rotatable connection between one end of said cross shaft and one of said arms, and additional means forming a slidable connection between the other end of said cross shaft and the other of said arms.

5. A wishbone assembly for a wheel suspension or the like comprising, in combination, a pair of wishbone arms connected together in converging relation at the respective ends thereof, a buffer support, a cross member for supporting said buffer support, means rigidly connecting one end of said cross member to one of said arms, and means slidably connecting the other end of said cross member to the other of said arms.

6. A wishbone assembly for a wheel suspension or the like comprising, in combination, a pair of wishbone arms connected together in converging relation at the respective ends thereof, a buffer support, a shaft for supporting said buffer support, means forming a spline connection between one end of said shaft and one of said arms, the other of said arms having a transverse opening for freely and slidably receiving the other end of said shaft.

7. A wishbone assembly for a wheel suspension or the like comprising, in combination, a pair of wishbone arms connected together in converging relation at the respective ends thereof, a buffer support, a plate member for supporting said buffer support, means rigidly connecting one end of said plate to one of said arms, the other end of said plate being freely supported upon one edge of the other arm.

8. In a wishbone assembly for a wheel suspension or the like having a pair of wishbone arms connected together at the respective ends thereof, the combination of a shaft extending between said arms, means pivotally connecting the opposite ends of said shaft to said arms respectively, means intermediate the ends of said shaft defining a connecting opening, a spring pan, and a member connected to said pan and passed through said opening for securing said pan to said shaft.

9. In a wishbone assembly for a wheel suspension or the like having a pair of wishbone arms connected together at the respective ends thereof, the combination of a shaft extending between said arms and formed intermediate its ends to define a pair of spaced connecting openings, a spring pan, means connected to said spring pan and passed through said openings for securing said pan to said shaft, and means pivotally connecting the opposite ends of said shaft to said arms respectively.

10. In a wishbone assembly for a wheel suspension or the like having a pair of wishbone arms connected together at the respective ends thereof, the combination of a shaft extending between said arms and formed intermediate its ends to define a pair of spaced connecting openings, a spring pan, means connected to said spring pan and passed through said openings for securing said pan to said shaft, and means forming a pivotal threaded bearing connection between the ends of said shaft and said arms respectively.

JOHN W. LEIGHTON.